Patented July 14, 1942

2,289,437

UNITED STATES PATENT OFFICE 2,289,437

SULPHURIZATION PROCESS

Edwin C. Knowles and Frederic C. McCoy, Beacon, N. Y., assignors, by mesne assignments, to The Texas Company, New York, N. Y., a corporation of Delaware No Drawing. Application September 28, 1940, Serial No. 358,876

7 Claims. (Cl. 260—399)

This invention relates to a process of sulphurizing unsaturated organic compounds (i. e., compounds which contain aliphatic unsaturated linkages, which may appear in an open chain or in a ring), particularly complex liquid mixtures such as animal, vegetable and mineral oils comprising unsaturated compounds. The invention also relates to sulphurized products which possess exceptionally good color characteristics.

It has long been known that the properties of oils comprising unsaturated compounds can be altered in important respects by treating the oils so as to introduce sulphur therein. For example, it has been proposed to sulphurize oils by heating them with sulphur at an elevated temperature. The sulphurized products obtained by heating an oil with sulphur, while possessing properties which make them valuable for various uses, generally are extremely dark in color. When used in making up various types of compositions such as lubricating oils, for example, these products are unsatisfactory because they yield discolored compositions.

It is an object of the present invention to provide a process for sulphurizing unsaturated organic compounds, particularly oils comprising unsaturated compounds, whereby sulphurized products are obtained which have exceptionally good color characteristics, in many cases being of substantially the same color as the starting material used in their preparation. Another object of the invention is to provide new sulphurized products which may be added to lubricating oils to improve the properties thereof without causing discoloration of the oils.

Other objects of the invention will in part be obvious and will in part appear hereinafter.

The present invention is based upon the discovery that by reacting an unsaturated organic compound with sulphur at a temperature of at least 300° F. in the presence of water and under a pressure of hydrogen sulphide, sulphurized products are obtained which have exceptionally good color characteristics. Thus, it has been found that by reacting an animal or vegetable oil comprising unsaturated compounds, such as glycerides of unsaturated higher fatty acids, with sulphur at a temperature of at least 300° F. and under a pressure of hydrogen sulphide, sulphurized products may be obtained capable of a wide variety of uses. These products are distinguished from the usual sulphurized oils in that they are considerably lighter in color, and hence may be employed in compositions where highly-colored products would be undesirable.

In carrying out the present process in accordance with a preferred manner of proceeding, sulphur, water, hydrogen sulphide, and an oil comprising unsaturated compounds are introduced into a reaction vessel. Although the order in which these materials are introduced into the reaction vessel may be varied, it is generally convenient to mix the oil, water, and sulphur either in the reaction vessel or before introducing them into the vessel, and then, after closing the vessel, to introduce the hydrogen sulphide through a suitable port. The reaction mixture is heated to a temperature of at least 300° F., preferably between 320° and 330° F. Sufficient hydrogen sulphide is employed to create a substantial pressure in the reaction vessel due to this compound. The mixture is maintained at the reaction temperature until substantially all of the free sulphur has entered into combination. Under the conditions specified this point is reached in a relatively short period of time. Thus, by maintaining the reaction mixture at a temperature of at least 300° F. for from one-half hour to three hours, the reaction is usually complete.

At the completion of the reaction, the sulphurized product may be recovered in any suitable manner, the particular method employed depending primarily upon the specific character of the starting material. It is usually advisable first to cool the reaction mixture so as to prevent over-reaction. This may be done before releasing the pressure in the reaction vessel. One convenient method for recovering the sulphurized product is to mix the reaction mixture with a water insoluble solvent for the sulphurized product and then to permit the resulting mixture to stand and form two layers. The water layer is drawn off and the solvent is removed from the sulphurized product by vaporization, preferably under reduced pressure conditions.

In this process it is important to control several conditions if products of particularly valuable properties are to be obtained. As brought out in the following discussion, the partial pressure of hydrogen sulphide in the reaction vessel affects the properties of the products. This pressure preferably is not permitted to drop below 50 pounds per square inch and may be as high as 300 pounds per square inch or higher. It has also been found that the amount of water used has an important effect upon the properties of the sulphurized products. Thus, if the water is used in an amount less than that corresponding to a weight ratio of water to unsaturated organic liquid of one to two, the color of the products is not as good as when the water is employed at least in this amount. Although a greater quantity of water appears to have no adverse effect upon the properties of the products, apparently no improvement results and therefore a greater quantity ordinarily would not be used. In general, it may be stated that the weight ratio between the water and the liquid should be maintained from 1:2 to 2:1.

Although the invention is not limited to any theory of operation, it may be of advantage to point out that researches leading to the development of the invention have indicated that proceeding as above described prevents excessive polymerization due to linkage of double bonds. It appears that the dark color characteristic of ordinary sulphurized oils is due at least in part to excessive polymerization of this type. When sulphur alone is used in sulphurization, hydrogen sulphide is evolved and this elimination of hydrogen sulphide produces unsaturation. The additional unsaturation places the compound being treated in condition to continue to polymerize by linkage or condensation through double bonds. By maintaining substantial hydrogen sulphide pressure, the evolution of hydrogen sulphide is prevented. The function of the water in the process is not clearly understood, but is apparently cooperates with the hydrogen sulphide to prevent excessive polymerization. When water is omitted, darker products results. Also the short period of time in which the present process may be carried out is an important factor in producing valuable sulphurized materials.

As will be apparent from a consideration of the following examples, as the temperature of the reaction mixture is raised the total pressure in the reaction vessel increases to a peak and then begins to decrease. Towards the end of the reaction, the pressure due to hydrogen sulphide is less than at a prior period during the heating, indicating that the hydrogen sulphide not only dissolves in the reaction mixture under the pressure conditions, but also undergoes some reaction with the material being sulphurized. That a reaction occurs is also borne out by the fact that in many cases the sulphurized products contain more sulphur than the amount of free sulphur used would lead one to expect.

The present process may be employed for the treatment of a wide variety of unsaturated organic compounds. The unsaturated organic compounds are usually used in the form of mixtures, which may contain compounds other than unsaturated organic compounds, and which are preferably liquids. In this connection it is pointed out that the term "liquid" is employed herein in its broad sense and includes not only substances which are completely liquid at ordinary temperatures, but also substances which are partially liquid at such temperatures. For example, lard oil, which solidifies at about 50° F. and is partially liquid at 70° F. is a suitable starting material. As previously indicated, valuable products are obtained when animal, vegetable or mineral oils comprising unsaturated compounds are employed as starting materials in the present process. Valuable products are also obtained when using as starting materials, unsaturated fatty acids, especially unsaturated higher fatty acids, and salts and esters of unsaturated fatty acids. The following substances are representative of the types of substances which may be used as starting materials: vegetable oils such as peanut oil, rapeseed oil, cotton seed oil, corn oil, linseed oil, Perilla oil, castor oil, and soy bean oil; animal oils, such as lard oil, sperm oil, and fish oils (e. g., menhaden oil, whale oil, and seal oil); abietic acid; turpentine; acids of the oleic series, which have the type formula $C_nH_{2n-2}O_2$; acids of the linolic series, which have the type formula $C_nH_{2n-4}O_2$; acids of the linolenic series, which have the type formula $C_nH_{2n-6}O_2$; unsaturated higher fatty acids containing constituents such as hydroxyl groups (e. g., ricinoleic acid); and polyvalent metal salts of unsaturated fatty acids. The fatty acids from which the salts and esters are derived may be, for example, any of the unsaturated acids referred to above or any of the unsaturated acids whose glycerides are contained in the above named oils. As examples of suitable petroleum oils, there may be mentioned oils comprising unsaturated hydrocarbons, including polymer oils such as polymers prepared by the vapor clay treatment of cracked naphtha distillate, furfural extracts, cracked residuum fractions, and oils prepared by halogenation of hydrocarbon oils followed by dehydrohalogenation.

Depending upon the characteristics of the starting material and also to some degree upon the severity of the conditions maintained during the process, products having varied properties may be prepared by the present process. In general, the products possess solubility in lubricating oils and may be employed with advantage as additives to such oils to improve the properties thereof, such as their tendency to cause corrosion of hard metal bearings under extreme conditions, their extreme pressure characeristics, and their viscosity index. The products are also of value as additives for cutting oils and for lubricating oils designed for lubricating Diesel engines. The latter oils are improved with respect to preventing ring-sticking by the addition of the sulphurized products.

As a feature of the invention it has been found that non-drying and semi-drying animal and vegetabl oils (i. e. vegetal oils) yield especially valuable products when treated by the present process. The products obtained from such oils under normal conditions of the process are light in color and possess good solubility in lubricating oils and cutting oils. When added to lubricating oils they act with particular efficacy to improve the above mentioned properties of the oils.

Products possessing properties which make them of interest for a number of divergent purposes may also be prepared by the process. For example, sulphurizing many materials in accordance with the present process results in products of increased viscosity. Thus, in sulphurizing a relatively highly unsaturated glyceride oil, preferably so as to introduce a high proportion of sulphur, viscous products are obtained. Products of this type are of interest as pour depressants, dewaxing aids, and viscosity index improvers. These products are also of interest for use as cutting oil additives, in protective coatings, in linoleum, as floor tile binders and as plywood binders. Materials obtained by saponification of the sulphurized vegetal oils are of interest for use as emulsifying agents, which agents may be employed in preparing asphalt emulsions. The product obtained by treating soy bean oil so as to introduce 19 per cent sulphur into the oil is a jelly-like mass which possesses some elasticity. This product may be heated with additional sulphur at a relatively low temperature to form a reaction product having valuable adhesive properties.

In order that the invention may be understood more fully reference should be had to the following examples in which are described typical ways of practicing the present process. It will be understood that these examples are given for illustrative purposes merely and are not intended as limitations of the invention.

*Example 1.*—200 grams of oleic acid are agitated with 100 grams of water and 20 grams of sulphur. The resulting emulsion is poured into a reaction vessel having an internal volume of 600 cc. and capable of withstanding substantial pressures. The reaction vessel is closed and 20 cc. of liquid hydrogen sulphide is introduced through a suitable port; then, while agitating, the resulting reaction mixture is heated as rapidly as possible to temperatures within the range of 320° F. to 330° F. In ordinary equipment this requires 30 to 35 minutes. The temperature of the reaction mixture is maintained at 320° to 330° F. for 45 minutes, at which time substantially no free sulphur remains in the mixture. The reaction mixture is then cooled quickly by the action of cold water, the pressure in the vessel is released, and the reaction mixture is diluted with about an equal volume of methyl ethyl ketone. The resulting mixture is placed in a separatory funnel where a water layer and a layer composed of a methyl ethyl ketone solution form. The water layer is drawn off and the methyl ethyl ketone solution is filtered. The solvent is removed from the solution under vacuum, and the product is finally stripped with steam under vacuum to remove the last traces of solvent and hydrogen sulphide.

In carrying out the above process the total pressure in the reaction vessel varies between about 100 pounds and about 350 pounds per square inch. Thus, at all times during the reaction period the partial pressure of hydrogen sulphide is substantially above 50 pounds per square inch. The sulphurized product resulting from this process is a light-colored liquid. The sulphurized oleic acid contains 11.1 per cent sulphur, whereas on the basis of the free sulphur used the maximum amount theoretically possible is 9.1 per cent. This indicates that the hydrogen sulphide acts to introduce sulphur into the product.

*Example 2.*—700 grams of peanut oil, 350 grams of water, 70 grams of sulphur, and 70 cc. of liquid hydrogen sulphide are charged to a reaction vessel capable of withstanding relatively high pressures and provided with external heating means. The vessel, after being closed, is heated so as to bring the reaction mixture rapidly to a temperature above 300° F. The initial pressure on the reaction mixture at a temperature of 77° F. is 180 pounds per square inch. As the temperature increases from this point to 300° F. the pressure increases to about 295 pounds per square inch. The mixture is maintained at a temperature above 300° F. for a period of about 55 minutes. During this period the pressure decreases somewhat. At the end of this period the mixture, which contains substantially no free sulphur, is removed from the reaction vessel. The reaction vessel is washed out with methyl ethyl ketone, and the washings are added to the mixture. Additional methyl ethyl ketone is added to bring the total volume up to about 1500 cc. An aqueous layer separates and is drawn off. The methyl ethyl ketone solution is filtered and vacuum steam stripped to remove the solvent. The stripped oil is filtered to yield a light straw-colored oil which is a viscous jelly-like product, soluble in naphthene oil.

It will be recognized by those skilled in the art that the conditions described in the above examples may be varied. For example, in place of the starting materials employed in the examples, there may be used others of the class of unsaturated organic compounds disclosed above to yield valuable sulphurized products. Thus, there may be used any of the compounds and compositions specifically mentioned above. Generally the amount of sulphur employed is the same as that used in sulphurizations carried out with the use of sulphur alone. It will be understood in this connection, however, that the properties of the products may be varied in degree by using varying amounts of sulphur.

The time necessary to complete the sulphurization reaction may be determined in any particular case by analyzing withdrawn samples of the reaction mixture to detect the presence of free sulphur. When free sulphur is substantially absent in the reaction mixture, the reaction is complete. As stated above, the reaction requires not more than three hours and may take as little as 30 minutes. When vegetal oils are used as starting materials, the reaction is completed in from 40 to 90 minutes. Although substantial reaction does not take place materially below 300° F., it is usually unnecessary to heat the reaction mixture much above this point. Thus, it may be stated in general that a reaction temperature of 300° F. to 375° F. is satisfactory.

Where in the appended claims an unsaturated organic compound is referred to, it will be understood that mixtures containing such compounds are included as well as single compounds. Also, where an unsaturated organic liquid is referred to, it will be understood that it is intended to include liquids which are single compounds and mixed liquids comprising unsaturated organic compounds.

Since changes may be made in the processes and products above described without departing from the scope of the invention, it will be understood that the above description is given for illustrative purposes merely and is not intended as a limitation of the invention.

We claim:

1. In the process of manufacturing sulphurized products involving reacting an organic compound containing one or more aliphatic unsaturated linkages with sulphur at an elevated temperature, the improvement which comprises carrying out the reaction at a temperature of at least 300° F. in the presence of water and under a pressure of hydrogen sulphide.

2. In the process of manufacturing sulphurized products involving reacting an organic compound containing one or more aliphatic unsaturated linkages with sulphur at an elevated temperature, the improvement which comprises maintaining at a temperature of at least 300° F. and under a pressure of hydrogen sulphide a reaction mixture containing the unsaturated organic compound, sulphur, and water, the weight ratio between the water and said compound being at least one to two, until substantially no free sulphur remains in the mixture, whereby the unsaturated organic compound is converted into a sulphurized product having good color characteristics.

3. In the process of manufacturing sulphurized products involving reacting an organic compound containing one or more aliphatic unsaturated linkages with sulphur at an elevated temperature, the improvement which comprises carrying out the reaction at a temperature of at least 300° F. in the presence of water and under a pressure of hydrogen sulphide of at least 50 pounds per square inch.

4. In the process of manufacturing sulphurized products involving reacting an organic liquid containing compounds possessing one or more aliphatic unsaturated linkages with sulphur at an elevated temperature, the improvement which comprises carrying out the reaction at a temperature of at least 300° F. in the presence of water and under a pressure of hydrogen sulphide of at least 50 pounds per square inch.

5. In the process of manufacturing sulphurized products involving reacting an organic compound containing one or more aliphatic unsaturated linkages with sulphur at an elevated temperature, the improvement which comprises maintaining at a temperature of at least 300° F. and under a pressure of hydrogen sulphide of at least 50 pounds per square inch a reaction mixture containing the unsaturated organic compound, sulphur, and water, the weight ratio between the water and said compound being at least one to two, until substantially no free sulphur remains in the mixture, whereby said compound is converted into a sulphurized product having good color characteristics.

6. The process of manufacturing sulphurized products which comprises reacting sulphur with an oil selected from the group consisting of non-drying and semi-drying vegetable and animal oils comprising unsaturated organic compounds at a temperature of at least 300° F. in the presence of water and under a pressure of hydrogen sulphide of at least 50 pounds per square inch.

7. The process of manufacturing sulphurized products which comprises maintaining at a temperature of at least 300° F. and under a pressure of hydrogen sulphide of at least 50 pounds per square inch a reaction mixture containing sulphur, water and an oil selected from the group consisting of non-drying and semi-drying vegetable and animal oils comprising unsaturated organic compounds, the weight ratio between the water and said oil being at least one to two, for from one-half to three hours until substantially no free sulphur remains in the mixture, whereby said oil is converted into a sulphurized product having good color characteristics.

EDWIN C. KNOWLES.
FREDERIC C. McCOY.